United States Patent
Kim et al.

(10) Patent No.: US 11,974,059 B2
(45) Date of Patent: Apr. 30, 2024

(54) IMAGE SENSOR, METHOD OF SENSING IMAGE, AND ELECTRONIC DEVICE INCLUDING THE SAME WITH DIFFERENT RESOLUTIONS

(71) Applicant: SAMSUNG ELECTRONICS CO., LTD., Suwon-si (KR)

(72) Inventors: Jungwoo Kim, Hwaseong-si (KR); Myunghwa Jung, Seoul (KR); Hyuck Choo, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/849,933

(22) Filed: Jun. 27, 2022

(65) Prior Publication Data

US 2023/0132809 A1    May 4, 2023

(30) Foreign Application Priority Data

Oct. 29, 2021 (KR) .................. 10-2021-0147161

(51) Int. Cl.
*H04N 25/75* (2023.01)
*H04N 25/46* (2023.01)
*H04N 25/50* (2023.01)

(52) U.S. Cl.
CPC ............. *H04N 25/75* (2023.01); *H04N 25/46* (2023.01); *H04N 25/50* (2023.01)

(58) Field of Classification Search
CPC .... H04N 23/667; H04N 23/815; H04N 25/42; H04N 25/75; H04N 25/46; H04N 25/50
See application file for complete search history.

(56) References Cited

U.S. PATENT DOCUMENTS

| | | | |
|---|---|---|---|
| 9,686,485 B2 | 6/2017 | Agranov et al. | |
| 2003/0169847 A1* | 9/2003 | Karellas | A61B 6/482 |
| | | | 378/98.3 |
| 2013/0070109 A1* | 3/2013 | Gove | H04N 25/702 |
| | | | 348/207.1 |
| 2020/0175301 A1 | 6/2020 | Nikhara et al. | |
| 2020/0389609 A1* | 12/2020 | Komai | H04N 25/59 |
| 2021/0075969 A1 | 3/2021 | Liu et al. | |

FOREIGN PATENT DOCUMENTS

| | | |
|---|---|---|
| KR | 10-1205128 B1 | 11/2012 |
| KR | 10-1574022 B1 | 12/2015 |

* cited by examiner

*Primary Examiner* — Nicholas G Giles
(74) *Attorney, Agent, or Firm* — Sughrue Mion, PLLC

(57) ABSTRACT

Disclosed are an image sensor, a method of sensing an image, and an electronic device including the image sensor. The image sensor includes a pixel array including a plurality of pixels, a readout circuit to read out a plurality of pixel signals received from the pixel array; and a controller to provide control signals to the pixel array, which includes three or more regions, each of the three or more regions having different sizes and control a processing of the plurality of pixel signals read out from the readout circuit based on the control signals provided to the pixel array to obtain an image, wherein the image has a first resolution in a first region, among the three or more regions, and a second resolution in a second region, among the three or more regions, the second resolution being lower than the first resolution.

18 Claims, 9 Drawing Sheets

FIG. 3

IMAGE SENSOR, METHOD OF SENSING IMAGE, AND ELECTRONIC DEVICE INCLUDING THE SAME WITH DIFFERENT RESOLUTIONS

CROSS-REFERENCE TO RELATED APPLICATION

This application is based on and claims priority under 35 U.S.C. § 119 to Korean Patent Application No. 10-2021-0147161, filed on Oct. 29, 2021, in the Korean Intellectual Property Office, the disclosure of which is incorporated by reference herein in its entirety.

BACKGROUND

1. Field

The disclosure relates to an image sensor, image sensing method, and an electronic device including the same.

2. Description of the Related Art

An image sensor includes a two-dimensional planar structure formed by arraying pixels, which are the smallest circuits, and receives light in a viewing region by using an optical system to capture an image.

Recently, in accordance with the demand for resolution improvement of an image sensor, the size of image data generated by the image sensor has increased. However, due to the limitation of physical specifications of an electronic device to which the image sensor is applied, reducing the size of an image sensor module may be necessary, and when the resolution of the image sensor is simply increased to realize a high image resolution, a frame rate may be lowered. The simple resolution enhancement increases an amount of information resulting in a load on the read-out circuit and interface speed.

SUMMARY

Provided are image sensors, image sensing methods, and electronic devices including the same that may prevent frame rate degradation while obtaining a required high-resolution image.

Additional aspects will be set forth in part in the description which follows and, in part, will be apparent from the description, or may be learned by practice of the presented embodiments of the disclosure.

According to an aspect of the disclosure, there is provided an image sensor including: a pixel array including a plurality of pixels; a readout circuit configured to read out a plurality of pixel signals received from the pixel array; and a controller configured to: provide control signals to the pixel array, which includes three or more regions of first to $n^{th}$ regions, where n is an integer greater than or equal to 3, each of the three or more regions having different sizes; and control a processing of the plurality of pixel signals read out from the readout circuit based on the control signals provided to the pixel array to obtain an image, wherein the image has a first resolution to an $n^{th}$ resolution in a first region to an $n^{th}$ region, wherein, a second resolution in a second region being lower than the first resolution, and the $n^{th}$ resolution being lower than an $n-1^{th}$ resolution in an $n-1^{th}$ region.

The first region may correspond to a central region of the pixel array, and the second region to the $n^{th}$ region are located away from the central region towards a periphery of the pixel array.

Each of the three or more regions may include a plurality of effective pixels, wherein the effective pixels of the first region have sizes corresponding to m pixels, where, m is a natural number greater than or equal to 1, wherein a number pixels corresponding to effective pixels of each of the second region to the $n^{th}$ region is greater than a number of pixels corresponding to the effective pixels of the first region and increases from the second region to the $n^{th}$ region.

The readout circuit may include a switching circuit configured to perform binning on the plurality of pixel signals of the pixel array so that the effective pixels of the first region have the sizes corresponding to the m pixels, and the number of pixels corresponding to each effective pixel of the first region to the $n^{th}$ region increases from the first region to the $n^{th}$ region.

The switching circuit may be further configured to form effective pixels of three or more sizes, by performing binning so that the sizes of the effective pixels gradually increase from the first region to the $n^{th}$ region.

The switching circuit may be provided to perform binning so that an effective pixel corresponds to a first size in a central region of the pixel array, and effective pixels become larger than the first size toward a periphery of the pixel array.

Each pixel of the pixel array may include a photo-sensing element, and a pixel circuit provided to obtain a pixel signal photoelectrically converted by the photo-sensing element of the pixel, wherein the pixel circuit includes a switching circuit to perform binning on the plurality of pixel signals of the pixel array so that the effective pixels of the first region have sizes corresponding to m pixels, where m is a natural number greater than or equal to 1, and the number of pixels corresponding to each effective pixel of the first region to the $n^{th}$ region increases from the first region to the $n^{th}$ region.

The switching circuit may be further configured to form effective pixels of three or more sizes, by performing binning so that the sizes of the effective pixels gradually increase from the first region to the $n^{th}$ region.

The switching circuit may be provided to perform binning so that an effective pixel corresponds to a first size in a central region of the pixel array, and effective pixels become larger than the first size toward the periphery of the pixel array.

The switching circuit of the pixel circuit may include a switching element to selectively sum pixel signals of pixels of a row selected by a row driver corresponding to effective pixels in the three or more regions, thereby selectively forming the effective pixels in the three or more regions.

The pixel array may have a structure in which physical pixels of a same size are arranged in a matrix shape.

The pixel array may be provided to have effective pixels of different sizes in the three or more regions by varying sizes of physical pixels according to location.

The first region may correspond to the center of the pixel array, and the three or more regions are sequentially located from the center towards a periphery of the pixel array, wherein the pixel array is provided to have a physical pixel of a first size at the center, and the size of a physical pixel increases towards the periphery.

A central region of the pixel array includes a plurality of pixels having the first size, and the pixel array includes pixels of second to $n^{th}$ sizes so that the sizes of the pixels gradually increases towards the periphery.

According to another aspect of the disclosure, there is provided an electronic device including: an image sensor configured to receive light reflected from an object, the image sensor including: a pixel array including a plurality of pixels; a readout circuit configured to read out a plurality of pixel signals received from the pixel array; and a controller configured to provide control signals to the pixel array, which includes three or more regions of first to $n^{th}$ regions, where n is an integer greater than or equal to 3, each of the three or more regions having different sizes; a processor configured to process the plurality of pixel signals received from the image sensor to form an image of the object having a first resolution to an $n^{th}$ resolution in a first region to an $n^{th}$ region, a second resolution in a second region being lower than the first resolution, and the $n^{th}$ resolution being lower than an $n-1^{th}$ resolution in an $n-1^{th}$ region.

According to another aspect of the disclosure, there is provided a method of sensing an image, the method including: reading out, by a readout circuit, a plurality of pixel signals received from a pixel array including a plurality of pixels; and providing control signals to the pixel array, which includes three or more regions of first to $n^{th}$ regions, where n is an integer greater than or equal to 3, each of the three or more regions having different sizes; and processing of the plurality of pixel signals read out from the readout circuit based on the control signals provided to the pixel array to obtain an image, wherein the image has a first resolution to an $n^{th}$ resolution in a first region to an $n^{th}$ region, a second resolution in a second region being lower than the first resolution, and the $n^{th}$ resolution being lower than an $n-1^{th}$ resolution in an $n-1^{th}$ region.

The method further includes forming effective pixels in the first region and effective pixels in the second region; and performing binning on the plurality of pixel signals of the pixel array so that the effective pixels of the first region have a size corresponding to m pixels, where m is a natural number greater than or equal to 1, and a number of pixels corresponding to each effective pixel of the first region to the $n^{th}$ region increases from the first region to the $n^{th}$ region.

The method further includes forming effective pixels of the three or more sizes, by performing binning so that the sizes of the effective pixels gradually increase from the first region to the $n^{th}$ region.

The method further includes performing binning so that an effective pixel corresponds to a first size in a central region of the pixel array, and effective pixels become larger than the first size toward a periphery of the pixel array.

The method further includes performing binning in the reading out, or performing binning on the plurality of pixel signals of the pixel array by switching to selectively sum sensing signals of respective photo-sensing element of the pixels of the three or more regions.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 exemplarily shows a pattern of the pixel array of FIG. 2;

DETAILED DESCRIPTION

Figure 1:
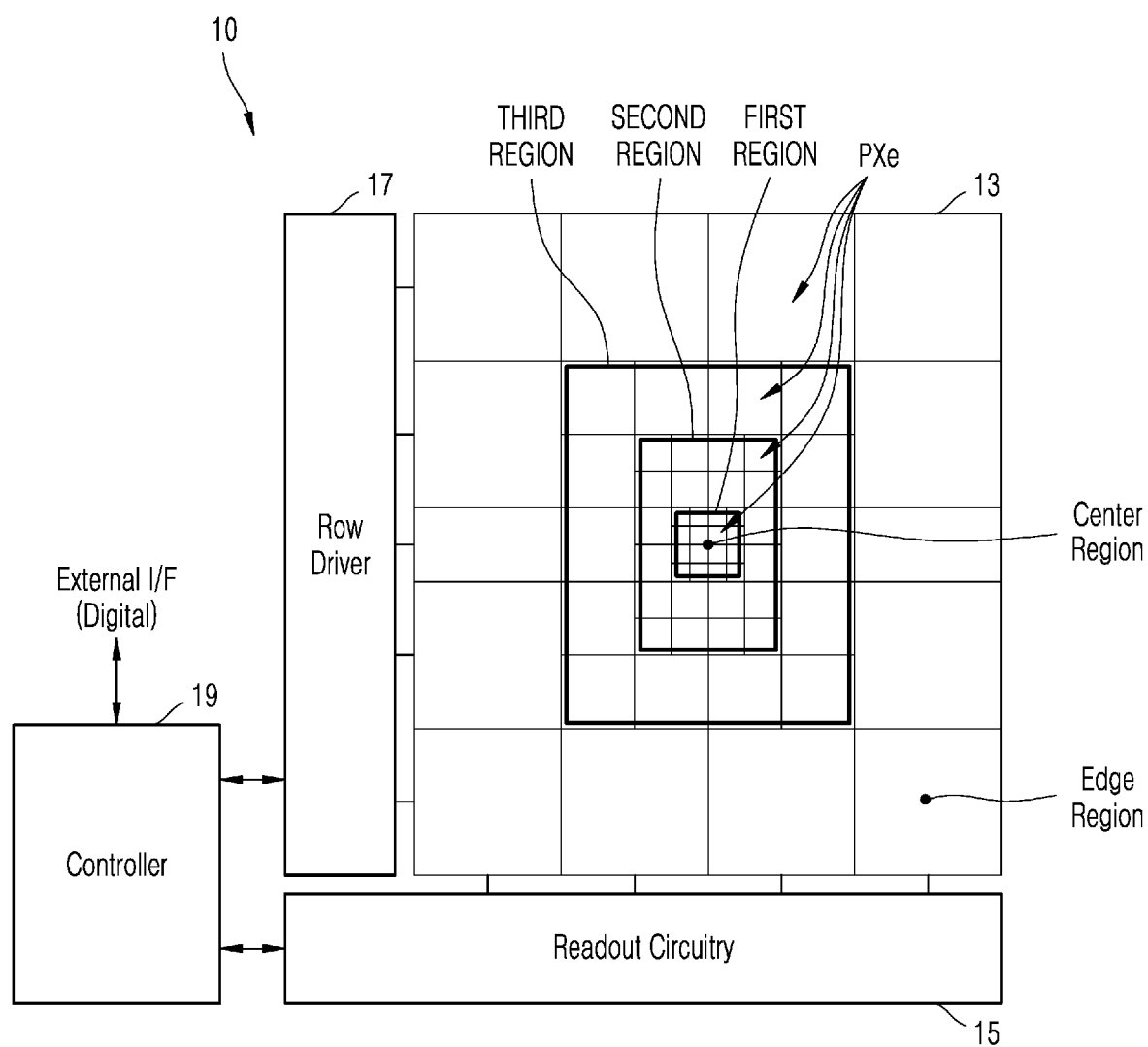
FIG. 1 is a schematic block diagram showing an image sensor according to an example embodiment.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereafter, the inventive concept will be described more fully with reference to the accompanying drawings. In the drawings, like reference numerals refer to like elements, and the size of each component may be exaggerated for clarity and convenience of explanation. The example embodiments of the inventive concept are capable of various modifications and may be embodied in many different forms.

Hereinafter, when an element is described using an expression "above" or "on", the element may include not only the element being immediately on/under/left/right in a contact manner, but also being on/under/left/right in a non-contact manner. Singular expressions include plural expressions unless the context clearly indicates otherwise. Also, when a part "comprises" or "includes" an element in the specification, unless otherwise defined, it is not excluding other elements but may further include other elements.

The use of the term "above" and similar referential terms may be used in both the singular and the plural. With respect to operations that constitute a method, the operations may be performed in any appropriate sequence unless the sequence of operations is clearly described or unless the context clearly indicates otherwise, and the operations may not necessarily be performed in the order of sequence.

Also, in the specification, the term "units" or " . . . modules" denote units or modules that process at least one function or operation, and may be realized by hardware, software, or a combination of hardware and software.

Connections of lines and connection members between constituent elements depicted in the drawings are examples of functional connection and/or physical or circuitry connections, and thus, in practical devices, may be expressed as replicable or additional functional connections, physical connections, or circuitry connections.

The use of all examples or example terms is merely for describing the technical scope of the inventive concept in detail, and thus, the scope of the inventive concept is not limited by the examples or the example terms as long as it is not defined by the claims.

An image sensor according to an example embodiment includes a pixel array including a plurality of pixels, a readout circuit configured to read out a plurality of pixel signals received from the pixel array, and a controller configured to provide control signals to the pixel array and control a plurality of pixel signals readout from the readout circuit. The image sensor according to an example embodiment is provided to obtain a high-resolution image in a region of interest of a user (e.g., the center region of the image sensor) and a low-resolution image in a relatively non-interested region of the user. That is, when the pixel array is divided into first to $n^{th}$ regions (n is an integer greater than or equal to 3), the image sensor according to an example embodiment may be provided to obtain an image of different resolutions in the first to $n^{th}$ regions, a high-resolution image in the region of interest, e.g., in the first region, and a relatively low-resolution image from the first region towards the $n^{th}$ region.

In this way, an image sensor having effective pixels of different sizes may be implemented by using a binning technique by forming a pixel array in which sizes of effective pixels vary according to location, although physical pixels have the same size. In this case, in order to implement an image sensor having effective pixels of different sizes by using a binning technique, for example, a readout circuit may include a switching circuit for implementing binning, and binning may be performed with respect to a plurality of pixel signals of the pixel array so that the effective pixel in the region of interest, for example, the first region corresponds to m pixels (here, m is a natural number greater than or equal to 1), and the number of pixels corresponding to the effective pixels increases from the first to the $n^{th}$ regions. Also, in order to implement an image sensor having effective pixels of different sizes by using a binning technique, for example, a pixel circuit may include a switching element for implementing binning, and binning may be performed with respect to a plurality of pixel signals of a pixel array so that the number of pixels corresponding to the effective pixels increases from the first region to the $n^{th}$ region by driving the switching element to selectively sum sensing signals of photo-sensing elements of the pixels so that the effective pixels of an interest region, for example, a first region correspond to m pixels (here, m is a natural number greater than or equal to 1), and the number of pixels corresponding to the effective pixels increases from the first to $n^{th}$ regions.

As another example, by forming a pixel array in which the sizes of physical pixels vary according to location, so that the sizes of the effective pixels vary with location, an image sensor may be implemented to obtain a high-resolution image in a region of interest (e.g., the center of the image sensor) of a user and a low-resolution image in a relatively non-interested region of the user.

In this way, by including a switching circuit for performing binning in a readout circuit or a switching element for performing binning in a pixel circuit to change the size of an effective pixel according to location, a high-resolution image may be obtained in a region of interest, for example, a first region, and a relatively low-resolution image may be obtained from the first to the $n^{th}$ regions, and thus, the total amount of pixel information may be reduced while realizing a high-resolution in the region of interest, thereby improving a frame rate.

In addition, by forming the pixel array such that a physical pixel located at a region corresponding to the region of interest, for example, the first region is formed to a first size, and the sizes of the physical pixels increases from the first region to the $n^{th}$ region to change the size of the physical pixel of the pixel array according to location, a high-resolution image may be obtained in the region of interest and a relatively low-resolution image may be obtained in the non-interested region. In this way, even when the size of the physical pixel of the pixel array is formed to vary depending on the location, the resolution of the region of interest may be realized with a high resolution, and the total amount of pixel information may be reduced, thereby improving the frame rate.

FIG. 1 is a schematic block diagram showing an image sensor 10 according to an example embodiment.

Referring to FIG. 1, the image sensor 10 according to an example embodiment includes a pixel array 13, a row driver 17, a readout circuitry 15, and a controller 19. The pixel array 13 includes a plurality of pixels. The readout circuitry 15 reads out a plurality of pixel signals received from the pixel array 13. The controller 19 provides control signals to the pixel array 13 to have effective pixels of different sizes according to positions on the pixel array 13, and controls a plurality of pixel signals read out from the readout circuitry 15.

The pixel array 13 includes a plurality of pixels, and each pixel includes a photo-sensing element and a pixel circuit.

As exemplarily shown in FIG. 1, when the pixel array 13 constituting the image sensing region is divided into first to $n^{th}$ regions (n is an integer greater than or equal to 3), the pixel array 13 may be provided to obtain an image of different resolutions in the first to $n^{th}$ regions. That is, the pixel array 13 may be obtain a high-resolution image in the region of interest, for example, the first region, and a relatively low-resolution image in the non-interested region, for example, the $n^{th}$ region, etc. Also, the image sensor 10 according to an example embodiment may be provided, for example, to obtain an image whose resolution is relatively lowered from the first region to the $n^{th}$ region.

In FIG. 1, partitioned regions of the pixel array 13 represent effective pixels (PXe). For example, the first region may include one or more effective pixels PXe having a first size. The second region may include one or more effective pixels PXe having a second size. The third region may include one or more effective pixels PXe having a third size. The $n^{th}$ region may include one or more effective pixels PXe having an $n^{th}$ size. The first region includes an effective pixel PXe having the first size, and the size of the effective pixel PXe may increase from the first region to the $n^{th}$ region. That is, the size of the effective pixel PXe in the first to $n^{th}$ regions may satisfy the condition of $n^{th}$ size> . . . > third size>second size>first size. As such, the first to $n^{th}$ regions of the pixel array 13 may be divided into regions including effective pixels PXe of respective sizes.

When the effective pixels PXe in the first to $n^{th}$ regions have a size in the order of $n^{th}$ size> . . . >third size>second size>first size, high-resolution image information may be obtained through the first region, relatively low-resolution image information may be obtained through the $n^{th}$ region, and it is possible to obtain an image whose resolution is relatively lowered from the first region to the $n^{th}$ region. In FIG. 1 and embodiments described below, for convenience, it is shown and described that the size of the effective pixel PXe in the first to $n^{th}$ regions is in the order of $n^{th}$ size> . . . >third size>second size>first size, but the sizes of the effective pixels PXe in the first to $n^{th}$ regions are not limited in this order, and the sizes of the effective pixels PXe may be variously changed.

Also, in FIG. 1, it is shown that the arrangement according to the size of the effective pixel PXe of the pixel array 13 is made so that the second region including an effective pixel PXe of a second size is located around the first region including an effective pixel PXe of a first size, and the third region including an effective pixel PXe of a third size is located around the second region, but the arrangement according to the size of the effective pixel PXe is not limited thereto, and may be variously changed.

According to the image sensor 10 according to an example embodiment, in order to vary the size of effective pixel PXe according to the location on the pixel array 13, for example, physical pixels having the same size may be formed in a two-dimensional array, and binning may be used to form the pixel array 13 in which the size of effective pixel PXe varies according to location on the pixel array 13. In addition, according to the image sensor 10 according to an example embodiment, the pixel array 13 in which the size of the effective pixel PXe varies depending on the location may be formed by forming the physical pixels to have different sizes depending on the location so that the effective pixels PXe correspond to the physical pixels, respectively.

The image sensor 10 according to an example embodiment may include a circuit configured as follows so that the pixel array 13 includes physical pixels having the same size and the sizes of effective pixel PXe varies depending on the location by using binning.

For example, the readout circuitry 15 may include a switching circuit for implementing binning, and binning may be performed with respect to a plurality of pixel signals of the pixel array 13 so that the effective pixel PXe of the region of interest, e.g., the first region corresponds to m of pixels (here, m is a natural number greater than or equal to 1), and the number of pixels corresponding to the effective pixel PXe increases from the first to $n^{th}$ regions, such that the size of the effective pixel PXe may be varied depending on the location.

In addition, for example, the pixel circuit may include a switching element for implementing binning, and the switching element may be driven to selectively sum detection signals of photo-sensing elements of the pixels so that an effective pixel PXe of the region of interest, for example, the first region corresponds to m pixels (here, m is a natural number greater than or equal to 1), and the number of pixels corresponding to the effective pixel PXe increases from the first to $n^{th}$ regions, such that binning may performed on a plurality of pixel signals of the pixel array 13 to increase the number of pixels corresponding to the effective pixel PXe from the first to $n^{th}$ regions, and thus, the size of the effective pixel PXe may be varied depending on the location. As described above, because a switching circuit for performing binning in the readout circuitry 15 or a switching element for performing binning in the pixel circuit is provided to vary the size of the effective pixel PXe according to location, a high-resolution image may be obtained in the region of interest, for example, in the first region and a relatively low-resolution image may be obtained from the first region to the $n^{th}$ region, and thus, the total amount of pixel information may be reduced while realizing a high resolution in the region of interest, thereby improving a frame rate.

In addition, by forming the pixel array 13 such that the physical pixel corresponding to the region of interest, for example, the first region has a first size, and the size of the physical pixel increases from the first region to the $n^{th}$ region, the size of the physical pixel of the pixel array 13 may be formed to vary depending on the location, and thus, it is possible to obtain a high-resolution image in the region of interest and a relatively low-resolution image in the non-interested region.

In this way, even when the size of the physical pixel of the pixel array 13 is formed to vary depending on the location, the resolution of the region of interest may be realized with a high resolution and the total amount of pixel information may be reduced, thereby improving the frame rate. Meanwhile, in the image sensor 10 according to an example embodiment, the region of interest, that is, the first region may be determined as a location necessary to reduce the total amount of pixel information while realizing a high resolution image on the pixel array 13.

For example, as illustrated in FIG. 1, the first region may correspond to a central region of the pixel array 13, and the first to $n^{th}$ regions may be sequentially located from the central region to a periphery of the pixel array 13.

As described above, the first region may correspond to a location at which a high-resolution image is to be obtained, for example, the center of the pixel array 13. However, the first region is not limited to the central region of the pixel array 13, and the first region may be determined at another location on the pixel array 13 as necessary. According to the image sensor 10 according to an example embodiment, a resolution of a required region on the pixel array 13 may realize as a high-resolution while reducing the total amount of pixel information, thereby improving the frame rate.

Figure 2:
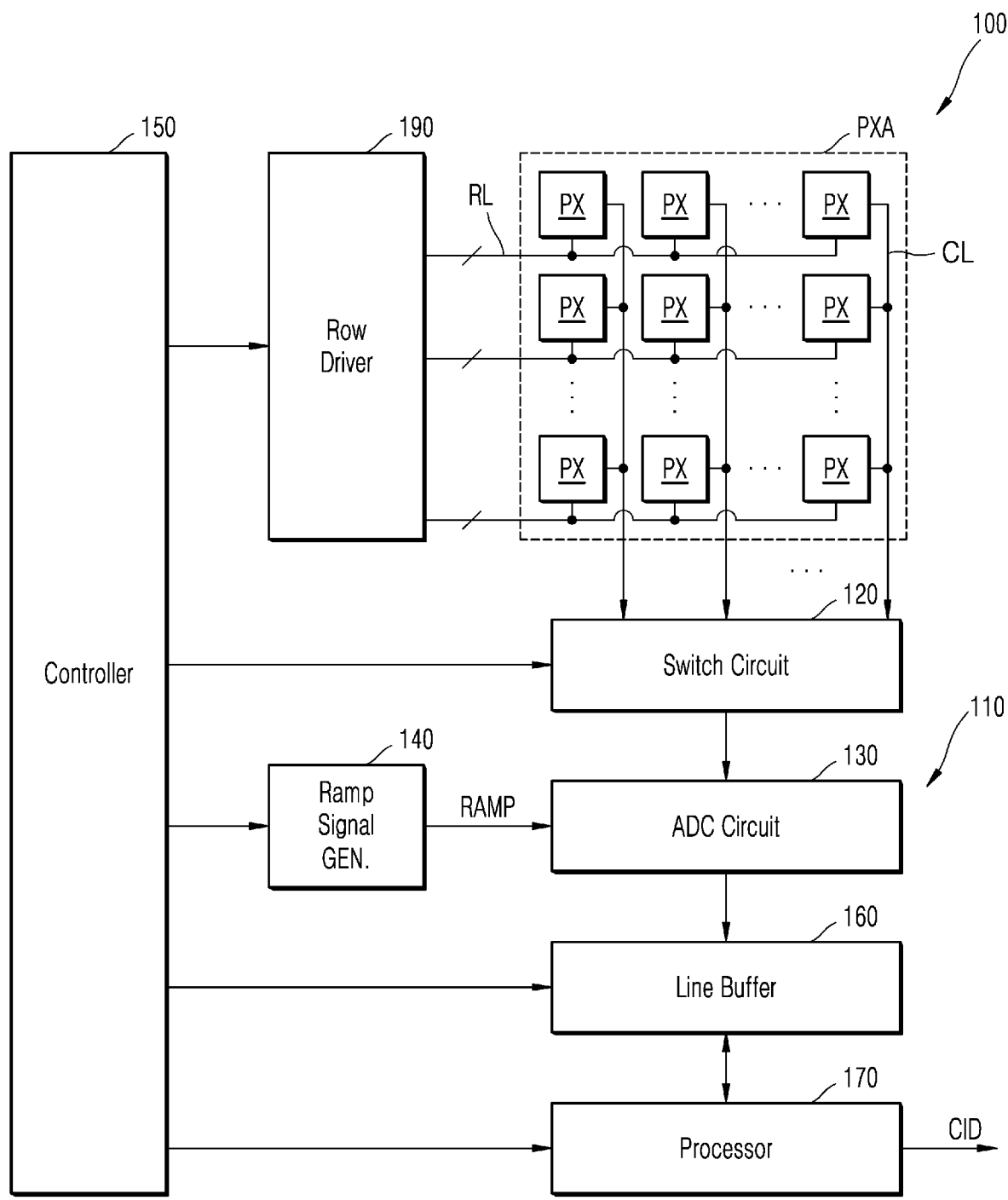
FIG. 2 is a schematic block diagram illustrating an image sensor according to an example embodiment.

FIG. 2 is a schematic block diagram showing an image sensor 100 according to an example embodiment.

Figure 3:
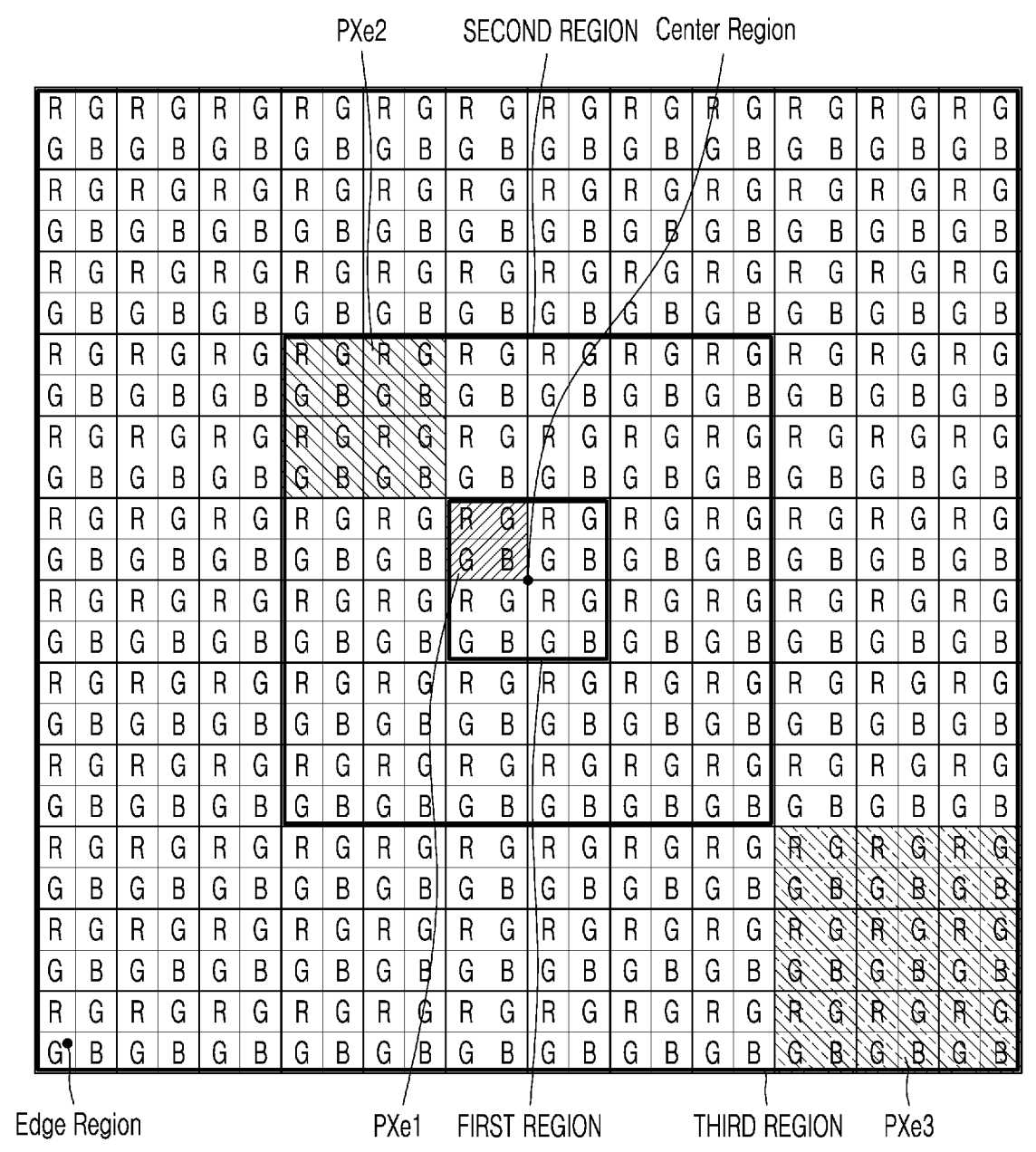

FIG. 3 illustrates a pattern of a pixel array PXA of FIG. 2 according to an example embodiment. Referring to FIGS. 2 and 3, the image sensor 100 according to an example embodiment includes the pixel array PXA including a plurality of pixels, a readout circuit 110 that includes an ADC circuit 130 and readouts a plurality of pixel signals received from the pixel array PXA, and a controller 150.

The image sensor 100 according to the example embodiment may further include a switching circuit 120 for performing binning to vary the size of an effective pixel PXe according to a location on the pixel array PXA. FIG. 2 shows an example in which the readout circuit 110 includes the switching circuit 120 for performing binning in which the size of the effective pixel PXe varies according to a location on the pixel array PXA. In order to perform binning in which the size of the effective pixel PXe varies according to a location on the pixel array PXA, the switching circuit 120 may be provided in a pixel circuit instead of providing the switching circuit 120 in the readout circuit 110. Meanwhile, the image sensor 100 according to an example embodiment may further include a ramp signal generator 140, a line buffer 160, a row driver 190, a processor 170, and the like.

According to an example embodiment, the switching circuit 120 may be provided in the readout circuit 110 or in the pixel circuit. The controller 150 may provide control signals to the pixel array PXA to obtain a high-resolution image in a region of interest and a relatively low-resolution image in a non-interested region by changing the size of the effective pixel PXe according to the location on the pixel array PXA and to control a plurality of pixel signals read out from the readout circuit 110. For example, in the image sensor 100 according to the example embodiment, the readout circuit 110 may include the ADC circuit 130 and further include a switching circuit 120 for implementing binning in which the size of the effective pixel PXe varies depending on the location, and binning may be performed on a plurality of pixel signals of the pixel array PXA so that, for example, the effective pixel PXe1 in the first region corresponds to m pixels (here, m is a natural number greater than or equal to 1), and the number of pixels corresponding to the effective pixels PXe2, PXe3, etc. increases from the first to $n^{th}$ regions.

In FIG. 3, PXe1 denotes an effective pixel in the first region, PXe2 denotes an effective pixel in the second region, and PXe3 denotes an effective pixel in the third region. The pixel array PXA includes 2 a plurality of pixels PX and a plurality of row lines RL and a plurality of column lines CL connected to the plurality of pixels PX.

The plurality of pixels PX may be arranged, for example, in a matrix. A photo-sensing element may be provided in each pixel PX to sense light and convert the sensed light into photocharges. The pixel array PXA may include a pixel circuit to obtain a pixel signal that is photoelectrically converted by the photo-sensing element of each pixel PX. The photo-sensing element may include an organic or inorganic material, such as an inorganic photo-diode, an organic photo-diode, a perovskite photo-diode, a photo-transistor, a photo-gate, or a pinned photo-diode. A micro lens for light collection may be disposed on each of the plurality of pixels PX or on each of pixel groups including adjacent pixels.

Each of the plurality of pixels PX may detect light in a specific spectral region from light received through the micro lens. For example, the pixel array PXA may include a red pixel R for converting light in a red spectral region into an electrical signal, a green pixel G for converting light in a green spectral region into an electrical signal, and a blue pixel B for converting light in a blue spectrum region into an electrical signal. A color filter for transmitting light in a specific spectral region may be disposed on each of the plurality of pixels PX. However, the example embodiment is not limited thereto, and the pixel array PXA may include pixels that convert light in a spectral region other than red, green, and blue into electric signals. As another example, the plurality of pixels PX may have a multi-layer structure. The pixel of the multi-layer structure includes stacked photo-sensing elements that convert light of different spectral regions into electrical signals, and electrical signals corresponding to different colors may be generated from the photo-sensing elements. That is, electrical signals corresponding to a plurality of colors may be output from one pixel PX. In the pixel array PXA, for example, pixels sensing signals of different colors may be repeatedly arranged in a column direction and a row direction.

Referring to FIG. 3, the pixel array PXA may include, for example, an RGB Bayer pattern.

For example, in the pixel array PXA, a row in which a red pixel R, a green pixel G, for example, a first green pixel G is arranged and a row in which another green pixel G, for example, a second green pixel G and a blue pixels B are arranged are repeatedly arranged, and the green pixels G, for example, the first green pixel G and the second green pixel G may be located on a diagonal line with each other. The green pixels G, for example, the first green pixels G and the second green pixels G may be disposed in all rows, and the red pixels R and the blue pixels B may be alternately disposed in each row. FIG. 3 shows a pixel array PXA of an RGB Bayer pattern, which is an example, and the example embodiment is not limited thereto. Various patterns in which the pixels PX of three or more different colors are repeatedly arranged may be applied to the pixel array PXA.

Meanwhile, as exemplarily shown in FIG. 3, the pixel array PXA may include physical pixels having the same size and may have a structure in which the physical pixels are arranged in a matrix, and, the size of the effective pixel PXe may vary depending on the location by including the switching circuit 120 for implementing binning in the readout circuit 110 or the pixel circuit.

As exemplarily shown in FIG. 3, when the pixel array PXA is formed in the Bayer pattern including a circuit pixel PX including two green pixels G, one red pixel R, and one blue pixel B, for example, the size of the effective pixel PXe1 in the first region may correspond to the size of one circuit pixel PX, the size of the effective pixel PXe2 in the second region may correspond to the size of 4 circuit pixels PX, and the size of the effective pixel PXe3 in the third region may correspond to the size of nine circuit pixels PX.

The effective pixels PXe1, PXe2, and PXe3 of the first to third regions illustrated in FIG. 3 are an example, and the example embodiment is not limited thereto, and the sizes of the effective pixels PXe in each region may vary. Also, in FIG. 3, the first region is located in the center region of the pixel array PXA and the first to $n^{th}$ regions are sequentially located from the center to the edge region of the pixel array PXA, but this is an example, and the example embodiment is not limited thereto.

The arrangement of the first to $n^{th}$ regions including the effective pixels PXe having the first to $n^{th}$ size may be variously modified as necessary. In addition, FIG. 3 exemplarily shows effective pixels PXe formed in the pixel array PXA and regions including the effective pixels PXe in a mode in which the switching circuit 120 forms the effective pixels PXe of various sizes under the control of the controller 150, and when the effective pixels PXe of various sizes are not formed and it is operated in a one-to-one mode in which the effective pixels PXe correspond to the pixels PX, each pixel PX may correspond to the effective pixel PXe.

Referring back to FIG. 2, the pixel array PXA may include a plurality of pixels PX arranged in a matrix and a plurality of row lines RL and a plurality of column lines CL connected to the plurality of pixels PX.

Each of the plurality of row lines RL may extend in a row direction and may be connected to pixels PX disposed in the same row.

For example, each of the plurality of row lines RL may transmit control signals output from the row driver 190 to devices included in the pixel PX, for example, each of the plurality of transistors. Each of the plurality of column lines CL may extend in a column direction and may be connected to a pixel PX disposed in the same column.

Each of the plurality of column lines CL may transmit a pixel signal output from the pixels PX, for example, a reset signal and a sensing signal, to the readout circuit 110 in a row circuit of the pixel array PXA. Some of the plurality of column lines CL may transmit pixel signals in circuits of at least two rows. The controller 150 may control the switching circuit 120 provided in the readout circuit 110 or the pixel circuit to perform binning on a plurality of pixel signals of the pixel array PXA so that the first region corresponds to m pixels PX (here, m is a natural number greater than or equal to 1), and the number of corresponding pixels PX increases from the first to $n^{th}$ regions.

In addition, the control circuit 150 may control the timing of other components of the image sensor 100, for example, the row driver 190, the ADC circuit 130 of the readout circuit 110, the ramp signal generator 140, the line buffer 160, and the processor 170.

The control circuit 150 may provide timing signals indicating an operation timing of each of the row driver 190, the switching circuit 120, the ADC circuit 130, the ramp signal generator 140, the line buffer 160, and the processor 170. The row driver 190 may generate control signals for driving the pixel array PXA under the control of the controller 150, and provide control signals to each of the plurality of pixels PX of the pixel array PXA through the plurality of row lines RL.

The row driver 190 may control the plurality of pixels PX of the pixel array PXA to sense light incident at the same time or in a row circuit. Also, the row driver 190 may select pixels PX in a row circuit or at least two row circuits from among the plurality of pixels PX, and may control the selected pixels PX to output pixel signals through the plurality of column lines CL. The ramp signal generator 140 may generate a ramp signal RAMP that increases or decreases with a predetermined slope and may provide the ramp signal RAMP to the ADC circuit 130.

The switching circuit 120 may be operated to transmit pixel signals corresponding to effective pixels PXe from a plurality of pixels PX in a row selected by the row driver 190 to the ADC circuit 130 to form effective pixels PXe of various sizes by binning.

Figure 4A:
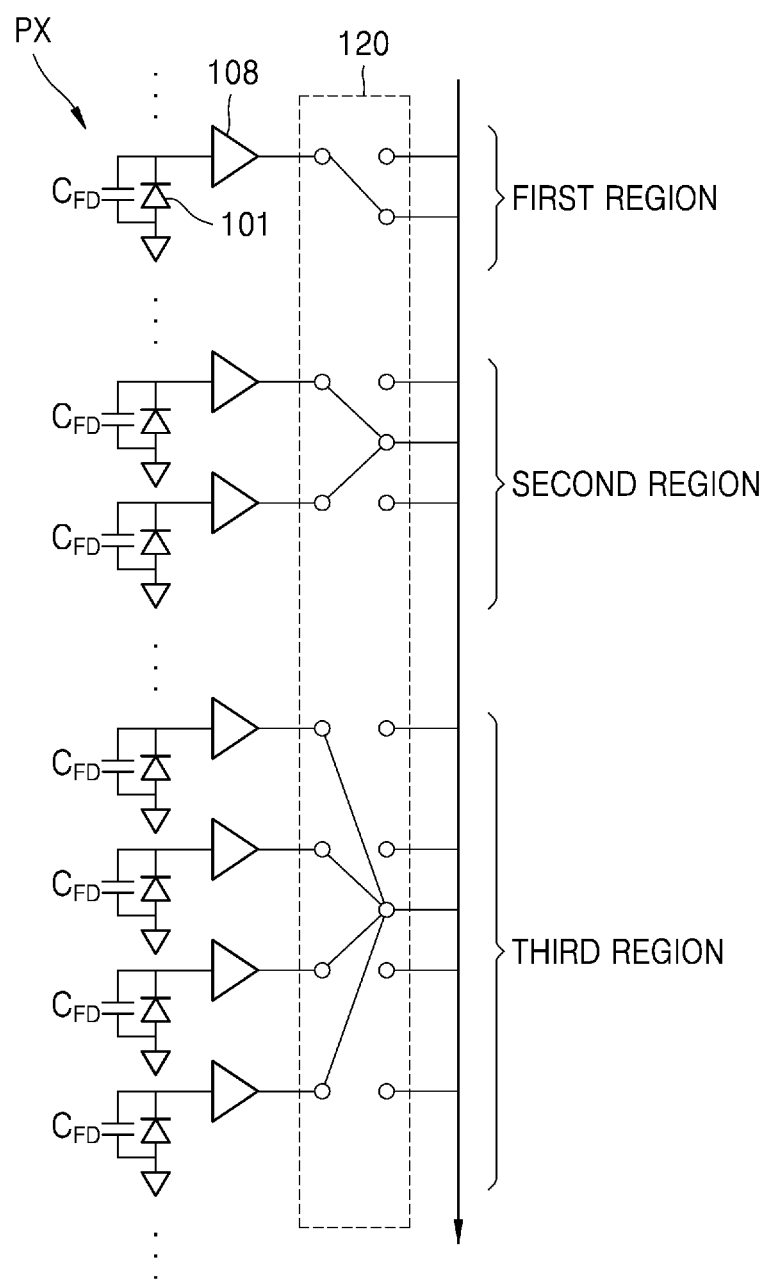
FIGS. 4A and 4B are diagrams illustrating an operation of a switching circuit in an image sensor according to an example embodiment.
Figure 4B:
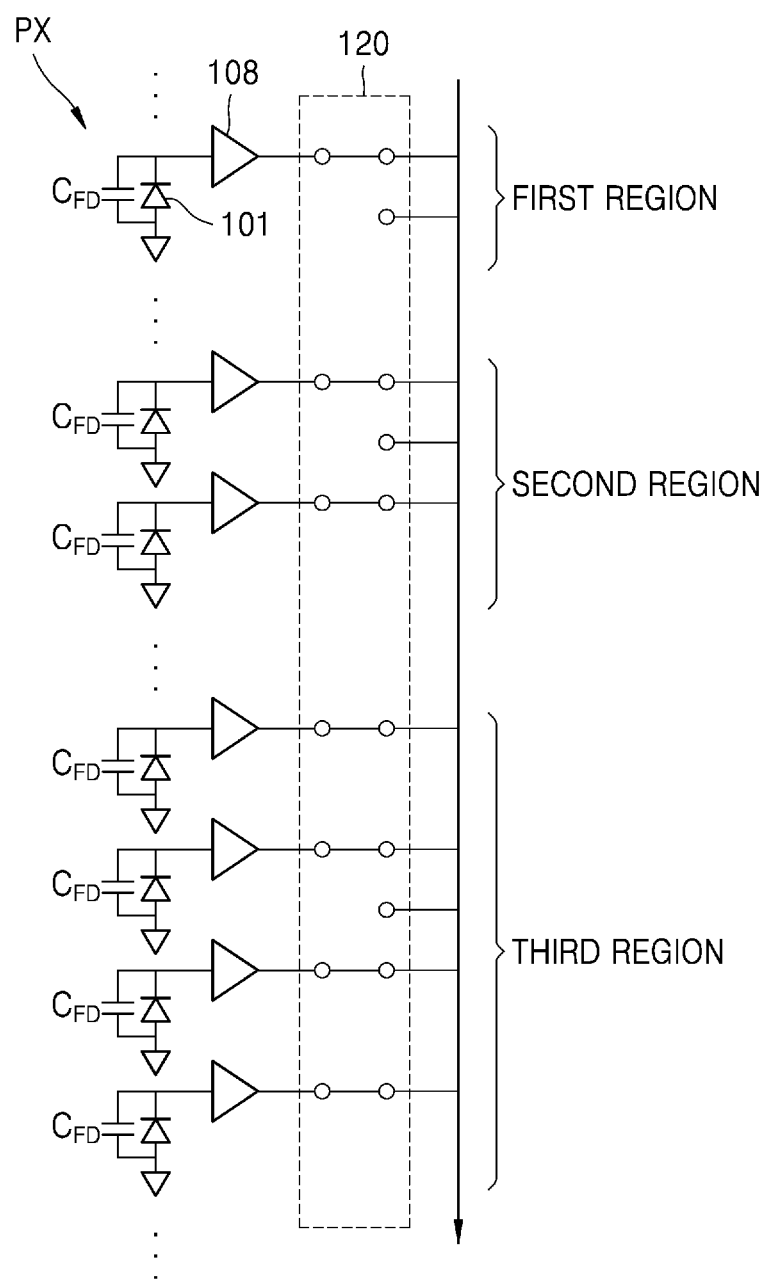

In addition, the switching circuit 120 may be operated to selectively transmit a plurality of pixel signals read out from a plurality of pixels PX in a row selected by the row driver 190 to the ADC circuit 130 without forming effective pixels PXe of different sizes. That is, the switching circuit 120 may be selectively operated in a mode in which effective pixels PXe of various sizes are formed under the control of the controller 150 as shown in FIG. 4A, and in a mode in which the effective pixel PXe corresponds one-to-one with the pixel PX as shown in FIG. 4B. FIGS. 4A and 4B show the operation of the switching circuit 120 in the image sensor 100 according to an example embodiment. FIG. 4A shows state in which the switching circuit 120 is operated in a mode in which effective pixels PXe of various sizes are formed and FIG. 4B shows a state in which the switching circuit 120 is operated in a mode in which the effective pixel PXe corresponds one-to-one with the pixel PX.

Figure 5:
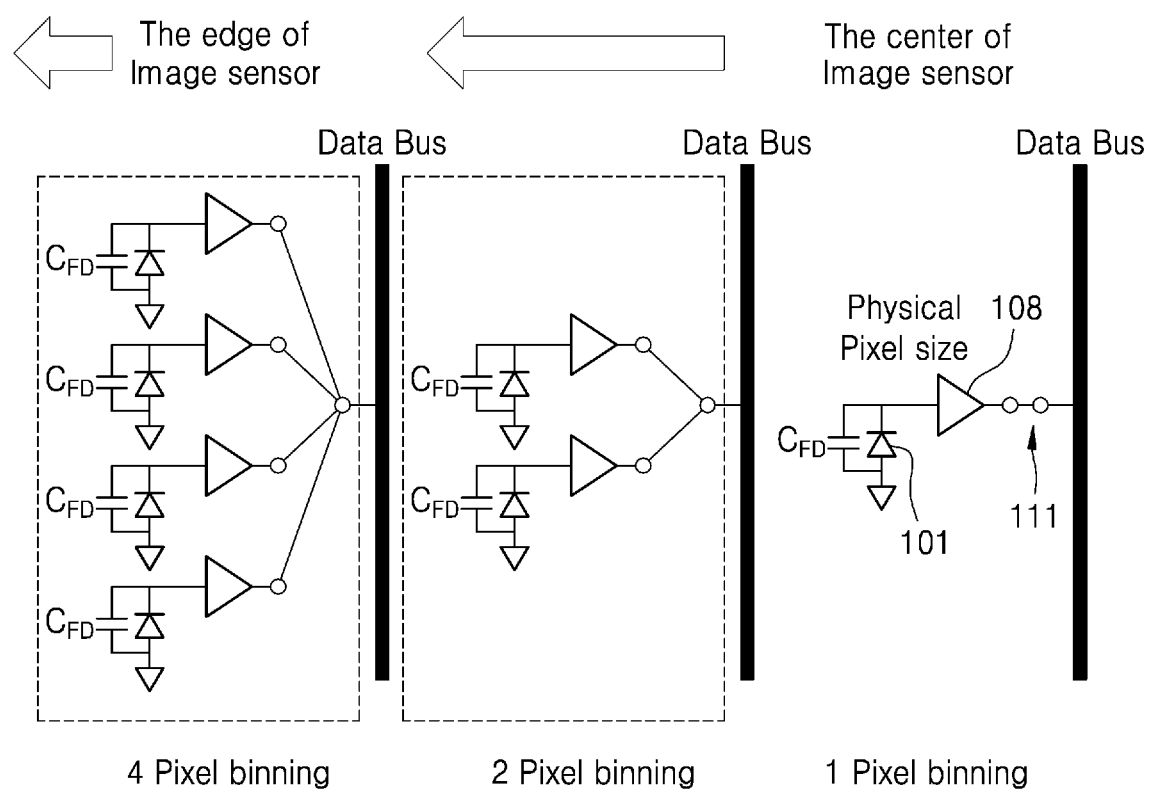
FIG. 5 schematically illustrates pixel binning according to an operation of a switching circuit.

FIG. 5 schematically shows pixel PX binning by using an operation of the switching circuit 120. Referring to FIGS. 4A and 4B, each pixel PX may include at least one photosensing element 101 and a pixel circuit, the photo-sensing element 101 generates photocharges by absorbing incident light energy, and the photocharges are accumulated in a floating diffusion node $C_{FD}$ and may be amplified and output by the amplifier 108.

In FIGS. 4A and 4B, it is shown that an effective pixel PXe is formed in a size of one pixel PX in the first region, an effective pixel PXe is formed in a size of two pixels PX in the second region, an effective pixel PXe is formed in a size of four pixels PX in the third region, but this is only an example, and the example embodiment is not limited thereto.

For example, in a formation mode of effective pixels PXe of various sizes, the effective pixel PXe in the first region is formed to have a size of one or more pixels PX, the effective pixel PXe in the second region is formed to have a size of two or more pixels PX, and the effective pixel PXe in the third region is formed to have a size of four or more pixels PX. In FIGS. 4A and 4B, a switching element of the switching circuit 120 connected to one end of an amplifier 108 in the circuit diagram may be located in the switching circuit 120 provided in the readout circuit 110 or in a pixel circuit of each pixel PX.

In this way, pixel signals generated in each pixel PX are input to the switching circuit 120 of the readout circuit 110 or is input to the switching circuit 120 provided in the pixel circuit, and may be binned to form effective pixels PXe of first to $n^{th}$ sizes in the first to $n^{th}$ regions.

By providing the switching circuit 120 to selectively form effective pixels PXe of various sizes by binning, the image sensor 100 according to an example embodiment obtains a high-resolution image from a first region which is a region of interest, for example, a center of a sensing region of the image sensor 100, and obtains a relatively low-resolution image from an $n^{th}$ region which is a non-interested region, for example, toward a periphery of the sensing region of the image sensor 100.

In a mode of forming effective pixels PXe of various sizes, it may be operated so that the effective pixels PXe of the first region correspond to the first size, and to obtain three or more sizes of the effective pixels PXe by performing binning so that the sizes of the effective pixels PXe corresponding to the first to $n^{th}$ regions gradually increase. In addition, to form effective pixels PXe of various sizes, signals passing through the switching circuit 120 may be transmitted to the ADC circuit 130. Meanwhile, in a mode in which the effective pixel PXe corresponds one-to-one with the pixel PX, the switching circuit 120 may be driven to transmit a plurality of pixel signals read out from the plurality of pixels in a row selected by the row driver 190 from among the plurality of pixels PX to the ADC circuit 130. As exemplarily illustrated in FIG. 1, each of the first to $n^{th}$ regions may include a plurality of effective pixels PXe.

For example, the first region may include a plurality of effective pixels PXe, and each effective pixel PXe of the first region may have a first size corresponding to m pixels (here, m is a natural number greater than or equal to 1). Also, the number of pixels PX forming the effective pixel PXe may increase from the first region to the $n^{th}$ region. The effective pixels PXe of the first to $n^{th}$ sizes in the first to $n^{th}$ regions, as exemplarily illustrated in FIG. 5, may be obtained by binning the pixel signals of the pixels PX forming the corresponding effective pixels PXe.

Here, because a signal obtained by binning corresponds to an effective pixel signal obtained from a corresponding effective pixel PXe, an effect of forming effective pixels PXe having different sizes according to location by binning may be obtained. A switching element 111 connected to one end of the amplifier 108 of the circuit diagram showing 1 pixel binning, 2 pixel binning, and 4 pixel binning of FIG. 5 may be located in the switching circuit 120 provided in the readout circuit 110 or in the pixel circuit of the pixel array PXA.

In this way, a pixel signal generated in each pixel PX may be input to the switching circuit 120 of the readout circuit 110 or input to the switching element 111 provided in the pixel circuit, and may be binned to form effective pixels PXe of first to $n^{th}$ sizes in the first to $n^{th}$ regions.

As exemplarily illustrated in FIG. 5, when binning 1 pixel, the effective pixel PXe may be formed, for example, to a physical pixel size of 1 pixel PX, when binning 2 pixels, the effective pixel PXe may be formed, for example, to have a size of 2 pixels PX or a square thereof, and when binning 4 pixels, the effective pixel PXe may be formed, for example, to have a size of 4 pixels PX or a square thereof. In addition, as shown in FIG. 5, one pixel binning is performed at the center of the image sensor 100, and the number of pixels PX to be pinning may increase toward the periphery of the image sensor 100. The binned pixel signal may be transmitted to the processor 170 through a data bus to form an image having different resolutions according to location. In this way, effective pixels PXe of various sizes on the pixel array PXA may be formed through a binning operation by using the switching circuit 120 provided in the readout circuit 110 or the switching element 111 provided in the pixel circuit.

When the first region has, for example, an effective pixel PXe having a size of one pixel PX, the switching circuit 120 of the readout circuit 110 or the switching circuit 120 of the pixel circuit may be operated so that pixel signals generated from pixels PX in a row selected by the row driver 190 that belongs to the first region are processed for each pixel signal.

When the second region has, for example, an effective pixel PXe of 2 pixels PX or a square thereof, the switching circuit 120 of the readout circuit 110 or the pixel circuit may be operated to process the pixel signals generated from the pixels PX belonging to the second region in such a way that the pixel signals of the two pixels PX in a row selected by the row driver 190 corresponding to the effective pixel PXe are summed. When the third region has, for example, an effective pixel PXe of 4 pixels PX or a square thereof, the switching circuit 120 of the readout circuit 110 or the pixel circuit may be operated to process the pixel signal generated from the pixels PX belonging to the third region in such a way that the pixel signals of the 4 pixels PX in a row selected by the row driver 190 corresponding to the effective pixel PXe are summed. Referring again to FIG. 2, the ADC circuit 130 may receive pixel signals corresponding to the effective pixel PXe read out from the plurality of pixels PX in a row selected by the row driver 190 among the plurality of pixels PX, and convert the pixel signals into a plurality of pixel PX values which are digital data.

The ADC circuit 130 may generate and output image data in a row circuit by converting pixel signals corresponding to the effective pixels PXe received from the pixel array PXA through the plurality of column lines CL based on a ramp signal RAMP generated from the ramp signal generator 140 into digital data.

The ADC circuit 130 may include a plurality of ADCs corresponding to a plurality of column lines CL, and each of the plurality of ADCs may compare pixel signals corresponding to an effective pixel PXe received through a corresponding column line CL with a ramp signal RAMP, respectively, and may generate a pixel PX value based on the comparison results.

For example, the ADC may remove a reset signal from a sensing signal by using a correlated double sampling (CDS) method and generate a pixel PX value indicating an amount of light sensed by the pixel PX. The line buffer 160 may include a plurality of line memories, and may store a plurality of pixel values output from the ADC circuit 130 in a predetermined row circuit.

In other words, the line buffer 160 may store image data output from the ADC circuit 130 in a predetermined row circuit. For example, the line buffer 160 may include three line memories corresponding to three rows of the pixel array PXA, and may store a plurality of effective pixel PXe values corresponding to three rows of image data output from the ADC circuit 130 in three line memories. The processor 170 may process a plurality of effective pixel PXe values corresponding to a plurality of rows of image data stored in the line buffer 160.

The processor 170 may perform, with respect to image data, image quality compensation, binning, downsizing, etc. in a predetermined row circuit stored in the line buffer 160, and may output image data CID. In a formation mode of effective pixels PXe of various sizes on the pixel array PXA, in order to form an image having different resolutions according to location through a binning operation by using the switching circuit 120 provided in the readout circuit 110 or the pixel circuit, the ADC circuit 130 may generate and output image data in row circuits, the line buffer may store image data output from the ADC circuit 130 in predetermined row circuits, and the processor 170 may output image data CID having a high-resolution in a region of interest and a low resolution in a non-interest region by processing a plurality of effective pixel PXe values corresponding to a plurality of rows of image data stored in the buffer 160.

In addition, in a mode in which the physical pixel PX on the pixel array PXA corresponds one-to-one with the effective pixel PXe, the ADC circuit 130 may generate and output image data in a row circuit from a plurality of pixel signals read out from a plurality of pixels PX in a row selected by the row driver 190, the line buffer may store image data output from the ADC circuit 130 in a predetermined row circuit, and the processor 170 may output image data CID having no resolution change according to location by processing a plurality of pixel PX values corresponding to a plurality of rows of image data stored in the line buffer 160.

The image sensors 10 and 100 according to the example embodiments may be mounted on an electronic device having an image or light sensing function.

Figure 6:
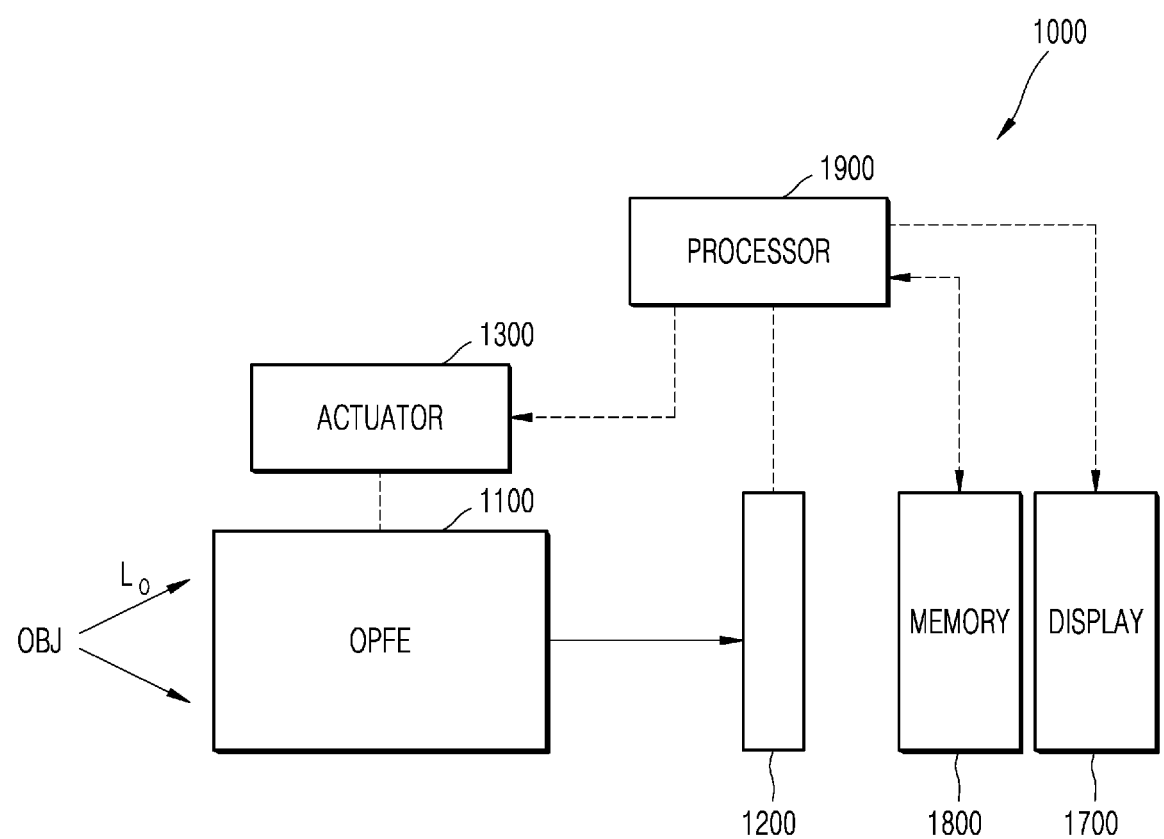
FIG. 6 is a schematic block diagram illustrating a configuration of an electronic device according to an example embodiment.

For example, the image sensor 10 or 100 may be mounted on an electronic device, such as a camera, a smartphone, a wearable device, an Internet of Things (IoT) device, a home appliance, a tablet Personal Computer (PC), a Personal Digital Assistant (PDA), a portable multimedia player (PMP), a navigation system, a drone, and an advanced driver assistance system (ADAS), etc. Also, the image sensor 10 or 100 may be mounted on an electronic device provided as a component in a vehicle, a furniture, a manufacturing facility, a door, various measurement devices, and the like. FIG. 6 is a schematic block diagram illustrating a configuration of an electronic device 1000 according to an example embodiment.

Referring to FIG. 6, the electronic device 1000 according to an example embodiment includes an image sensor 1200 and a processor 1900 configured to process a signal from the image sensor 1200, and the electronic device 1000 may be an imaging device capable of acquiring image information about an object OBJ.

The electronic device 1000 may also include an optical path folding element (OPFE) 1110 provided to form an image of the object OBJ at a location of the image sensor 1200, and an actuator 1300 provided to drive the OPFE 1100.

The electronic device 1000 may also include a memory 1800 in which a program code or data required for execution of the processor 1900 is stored and a display circuit 1700 for displaying an image.

The OPFE 1100 may include an optical lens consisting of m groups.

The OPFE 1100 may also include a path changing member that bends a path of light from the object OBJ and directs the light towards the image sensor 1200. Depending on whether the path changing member is provided and the arrangement form with the optical lens, it may be referred to as a vertical form or a folded form. The optical lens and the path changing member may be operated by the actuator 1300. For example, an optical lens included in the OPFE 1100 may move along an optical axis, and accordingly, an optical zoom magnification may be adjusted.

When a basic optical zoom magnification is Z, the optical zoom magnification may be changed to 3Z or 5Z or higher by moving at least some of the optical lenses included in the OPFE 1110 to adjust a distance between adjacent lenses. The actuator 1300 may drive at least some components included in the OPFE 1110.

The actuator 1300 may adjust the position of the optical lens so that the image sensor 1200 is located at a focal length of the optical lens and a desired zoom magnification is implemented. The image sensor 1200 may be provided to sense, for example, visible light or infrared light.

As the image sensor 1200, the image sensor 100 according to the above-described embodiments or a modified form thereof may be employed. Light $L_O$ from the object OBJ forms an image on the image sensor 1200 by the OPFE 1110.

The light $L_O$ from the object OBJ is incident on the image sensor 1200. The processor 1900 may process a signal from the image sensor 1200. Also, the processor 1900 may control an overall operation of the electronic device 1000, and may control, for example, the actuator 1300.

Meanwhile, the electronic device 1000 may further include an illumination circuit provided to illuminate the object OBJ with infrared light and an infrared sensor circuit to sense infrared light.

The infrared sensor circuit may be provided integrally with the image sensor 1200. For example, the image sensor 1200 may be provided to sense visible light, and the infrared sensor circuit may be formed in a stacked structure on the image sensor 1200 to sense visible light and infrared light substantially simultaneously.

Because this structure does not use, for example, a method of spatially dividing an optical path to obtain visible light information and infrared information about an object, dividing a resolution space of the image sensor 100 to be used, or temporally dividing visible light sensing and infrared sensing, the structure is simple and image processing may also be simplified.

In the case when the illumination circuit and the infrared sensor circuit are further included, the processor 1900 may process a signal from the infrared sensor circuit and may, for example, control the illumination circuit.

The illumination circuit may include a light source, such as a laser diode (LD), a light emitting diode (LED), or a super luminescent diode (SLD) that generates and emits light in an infrared band.

Such a light source may be configured to irradiate light in an infrared band, for example, in a wavelength band of 750 nm or more and 2500 nm or less. The illumination circuit may also include a configuration for irradiating light modulated with a predetermined frequency to the object OBJ, and may further include an optical member for adjusting a path or range of the irradiated light. In this way, when the illumination circuit and the infrared sensor circuit are further included, the processor 1900 may calculate depth information about the object OBJ from the infrared image information, and provide a 3D image of the object OBJ by combine it with the visible light image information.

Alternatively, the processor 1900 may calculate information on temperature or moisture of the object OBJ from the infrared image information, and may provide an image of a temperature distribution and moisture distribution combined with a two-dimensional image of the object OBJ. In order for the processor 1900 to acquire depth information from the light sensed by the infrared sensor circuit, a time of flight (TOF) method may be used.

The TOF method was introduced to obtain more accurate distance information. The TOF method is a method of irradiating a beam to an object OBJ and measuring a light flight time until the beam is reflected from the object OBJ and received by a light receiving circuit. According to the TOF method, after projecting light of a specific wavelength (for example, near infrared rays of 850 nm) to an object OBJ, receiving the light of the same wavelength reflected from the object OBJ at the light receiving circuit, a special process for extracting distance information is performed. Various TOF methods are known according to the series of light processing procedures. For example, in a direct time measurement method, a distance is obtained by projecting pulsed light onto an object OBJ and measuring the time it takes for the light to return after being reflected on the object OBJ with a timer. In a correlation method, after irradiating pulsed light onto an object OBJ, a distance is measured from a brightness of the light reflected from the object OBJ. In a phase delay measurement method, after irradiating light of a continuous wave, such as a sine wave onto an object OBJ, a phase difference of the light reflected from the object OBJ is detected and converted into a distance. For example, the processor 1900 may calculate depth image information of an object OBJ according to any one of the above-described methods, and may form a 3D image by combining the acquired depth image information with color image information.

Figure 7:
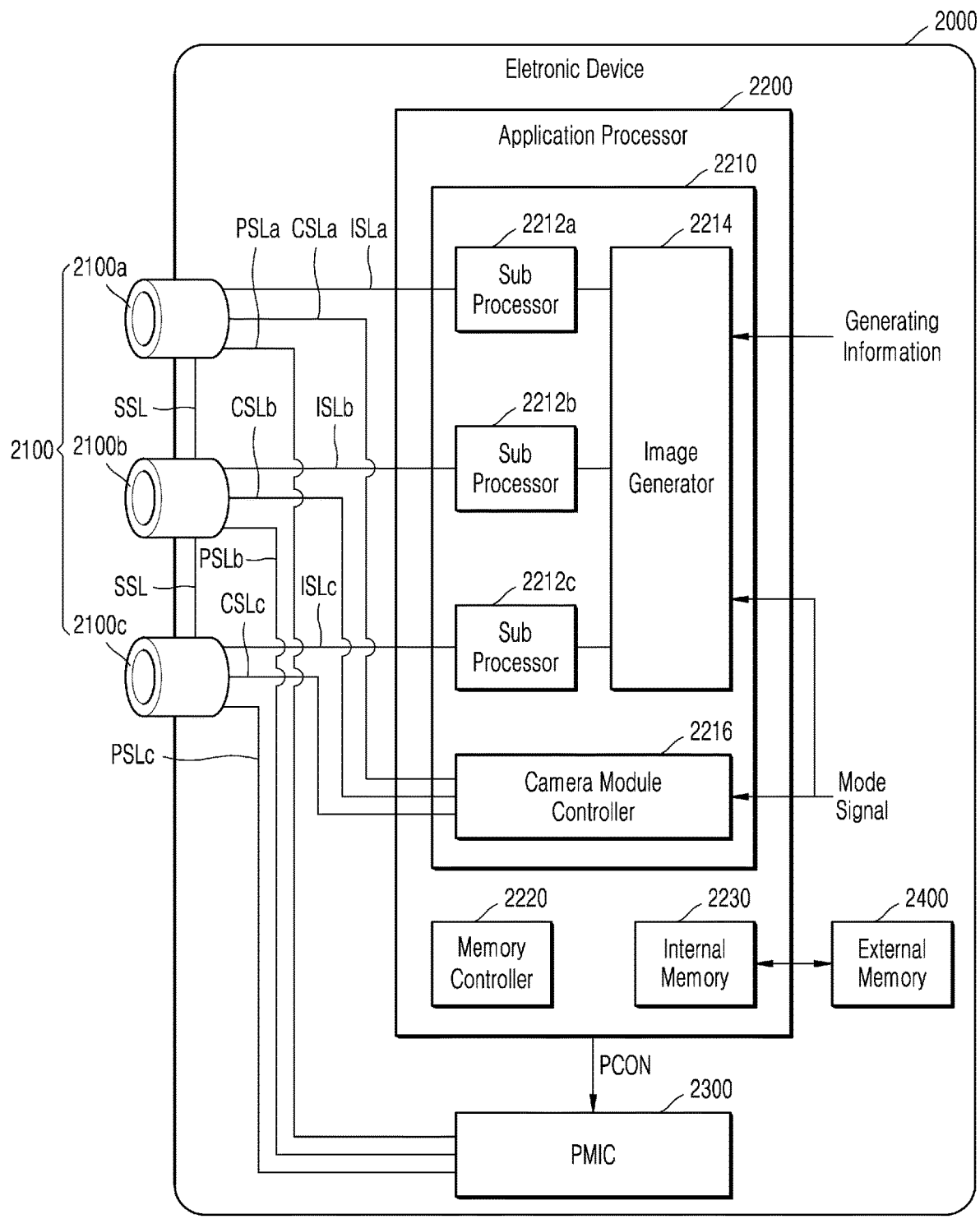
FIG. 7 is a schematic block diagram illustrating a configuration of an electronic device according to another example embodiment.
Figure 8:
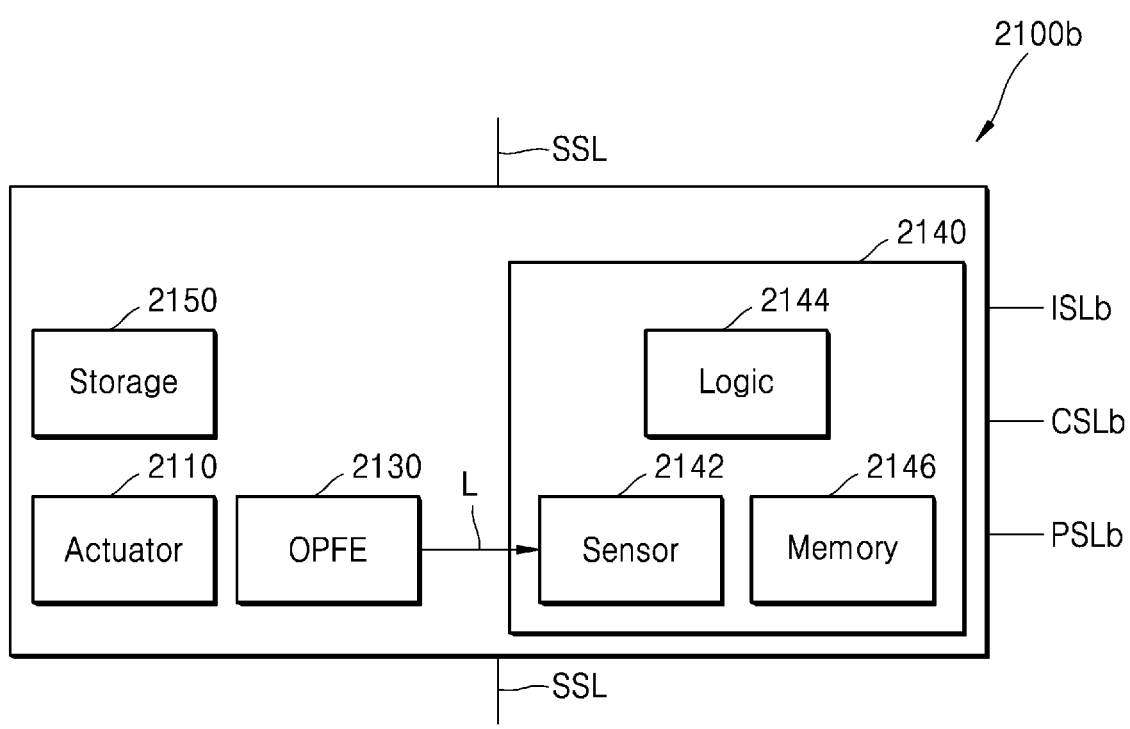
FIG. 8 is a schematic block diagram showing a configuration of a camera module provided in the electronic device of FIG. 7.

FIG. 7 is a schematic block diagram showing a configuration of an electronic device 2000 according to another example embodiment, and FIG. 8 is a schematic block diagram showing a configuration of a camera module 2100b provided in the electronic device 2000 of FIG. 7.

The electronic device 2000 according to the example embodiment is a device having an application utilizing a multi-camera module.

Referring to FIG. 7, the electronic device 2000 may include a camera module group 2100, an application processor 2200, a power management integrated circuit PMIC 2300, and an external memory 2400.

The camera module group 2100 may include a plurality of camera modules 2100a, 2100b, and 2100c.

Although FIG. 7 illustrates an example embodiment in which three camera modules 2100a, 2100b, and 2100c are provided, the disclosure is not limited thereto. As such, in some example embodiments, the camera module group 2100 may be modified to include only two camera modules. Also, in some embodiments, the camera module group 2100 may be modified to include n (n is a natural number greater than or equal to 4) camera modules. Referring to FIG. 8, a detailed configuration of the camera module 2100b included in the electronic device 2000 of FIG. 7 will be described.

The camera module 2100b illustrated in FIG. 8 may be applied to other camera modules 2100a and 2100c. Referring to FIG. 8, the camera module 2100b may include an image sensing device 2140, an OPFE 2130, an actuator 2110, and a storage circuit 2150.

The image sensing device 2140 includes an image sensor 2142, a control logic 2144, and a memory 2146. The OPFE 2130 may include one or more optical lenses, and may include a path changing member that bends a path of light to direct the light towards the image sensor 2142.

The camera module 2100b may have a vertical shape or a folded shape depending on whether the path changing member is provided and the arrangement shape with the optical lens. The actuator 2110 may drive the OPFE 2130.

By the actuator 2110, at least one of the optical lens and the path changing member constituting the OPFE 2130 may move. The actuator 2110 may adjust the position of the optical lens so that the image sensor 2142 is located at a focal length of the optical lens and a desired zoom magnification is implemented. The optical lens may move along an optical axis, and accordingly, the optical zoom magnification may be adjusted.

When a basic optical zoom magnification is Z, the optical zoom magnification may be changed to 3Z or 5Z or higher by moving at least some of the optical lenses included in the OPFE 1110 to adjust a distance between adjacent lenses. As the image sensor 2142, the image sensor 10 or 100 according to the above-described embodiment may be employed.

The control logic 2144 may control an overall operation of the camera module 2100b.

For example, the control logic 2144 may control the operation of the camera module 2100b according to a control signal provided through the control signal line CSLb. The memory 2146 may store information necessary for the operation of the camera module 2100b, such as calibration data.

The calibration data may include information necessary for the camera module 1100b to generate image data using light L provided from the outside. The calibration data may include, for example, information related to the driving of the OPFE 2130 by the actuator 2110, information about a focal length of an optical lens, information about an optical axis, etc. When the camera module 2100b is implemented in the form of a multi-state camera in which a focal length is changed according to the position of the optical lens, the calibration data 1147 may include a focal length value for each position (or state) of the optical lens and information related to auto focusing. The storage circuit 2150 may store image data sensed by the image sensor 2142.

The storage circuit 2150 may be disposed outside the image sensing device 2140, and may be implemented in a stacked form with a sensor chip constituting the image sensing device 2140. In some embodiments, the storage circuit 2150 may be implemented as an Electrically Erasable Programmable Read-Only Memory (EEPROM), but embodiments are not limited thereto. Referring back to FIG. 7, the application processor 2200 may include an image processing device 1210, a memory controller 2220, and an internal memory 2230.

The application processor 2200 may be implemented separately from the plurality of camera modules 2100a, 2100b, and 2100c. For example, the application processor 2200 and the plurality of camera modules 2100a, 2100b, and 2100c may be implemented by being separated from each other as separate semiconductor chips. An image processing device 2210 may include a plurality of sub-image processors 2212a, 2212b and 2212c, an image generator 2214, and a camera module controller 2216.

The image processing device 2210 may include a plurality of sub-image processors 2212a, 2212b, and 2212c corresponding to the number of the plurality of camera modules 2100a, 2100b, and 2100c.

Image data generated from each of the camera modules 2100a, 2100b, and 2100c may be provided to the corresponding sub-image processors 2212a, 2212b, and 2212c through image signal lines ISLa, ISLb, and ISLc separated from each other.

For example, image data generated from the camera module 2100a is provided to the sub-image processor 2212a through the image signal line ISLa, image data generated from the camera module 2100b is provided to the sub-image processor 2212b through the image signal line ISLb, and image data generated from the camera module 2100c is provided to the sub-image processor 2212c through the image signal line ISLc. The transmission of the image data may be performed by using, for example, a Camera Serial Interface (CSI) based on a Mobile Industry Processor Interface (MIPI), but embodiments are not limited thereto. Meanwhile, in some embodiments, one sub-image processor 2212b may be disposed to correspond to a plurality of camera modules.

For example, the sub-image processor 2212a and the sub-image processor 2212c are not implemented separately from each other as shown, but are integrated and implemented as one sub-image processor 2212b, and image data provided from the camera module 2100a and the camera module 2100c may be selected through a selection device (e.g., a multiplexer), and then, provided to the integrated sub-image processor 2212b. Image data provided to each of the sub-image processors 2212a, 2212b, and 2212c may be provided to the image generator 2214.

The image generator 2214 may generate an output image by using image data provided from each of the sub-image processors 2212a, 2212b, and 2212c according to image generating information or a mode signal. Specifically, the image generator 2214 may generate an output image by merging at least some of the image data generated from the camera modules 2100a, 2100b, and 2100c having different viewing angles according to image generation information or a mode signal.

In addition, the image generator 2214 may generate an output image by selecting any one of image data generated from the camera modules 2100a, 2100b, and 2100c having different viewing angles according to image generation information or a mode signal. In some embodiments, the image generation information may include a zoom signal or zoom factor.

Also, in some embodiments, the mode signal may be, for example, a signal based on a mode selected by a user. When the image generation information is a zoom signal (zoom factor) and each of the camera modules 2100a, 2100b, and 2100c has different viewing angles, the image generator 1214 may perform different operations depending on the type of the zoom signal.

For example, when the zoom signal is a first signal, after merging image data output from the camera module 2100a and image data output from the camera module 2100c, an output image may be generated by using the merged image signal and the image data output from the camera module 2100b not used for merging. If the zoom signal is a second signal different from the first signal, the image generator 2214 does not perform such merging of the image data, and may generate an output image by selecting any one of the image data output from each of the camera modules 2100a, 2100b, and 2100c. However, the example embodiments are not limited thereto, and the method of processing image data may be modified and implemented as needed. In some embodiments, the image generator 2214 receives a plurality of image data having different exposure times from at least one of the plurality of sub-image processors 2212a, 2212b, and 2212c and performs high dynamic range (HDR) processing with respect to the plurality of image data, and thus, may generate merged image data having an increased dynamic range.

The camera module controller 2216 may provide a control signal to each of the camera modules 2100a, 2100b, and 2100c.

A control signal generated from the camera module controller 2216 may be provided to the corresponding camera modules 2100a, 2100b, and 2100c through the control signal lines CSLa, CSLb, and CSLc separated from each other. Any one of the plurality of camera modules (2100a, 2100b, 2100c) is designated as a master camera (e.g., 2100*b*) according to image generation information or a mode signal including a zoom signal, and the remaining camera modules (e.g., for example, 2100*a* and 2100*c*) may be designated as slave cameras.

Such information may be included in the control signal and provided to the corresponding camera modules 2100*a*, 2100*b*, and 2100*c* through the control signal lines CSLa, CSLb, and CSLc separated from each other. A camera module operating as a master or a slave may be changed according to a zoom factor or an operation mode signal.

For example, the camera module 2100*a* has a viewing angle wider than that of the camera module 2100*b* and indicates a zoom magnification having a low zoom factor, the camera module 2100*b* may operate as a master and the camera module 2100*a* may operate as a slave. Conversely, when indicating a zoom magnification having a high zoom factor, the camera module 2100*a* may operate as a master and the camera module 2100*b* may operate as a slave. In some embodiments, a control signal provided from the camera module controller 2216 to each of the camera modules 2100*a*, 2100*b*, and 2100*c* may include a sync enable signal.

For example, when the camera module 2100*b* is a master camera and the camera modules 2100*a* and 2100*c* are slave cameras, the camera module controller 2216 may transmit a sync enable signal to the camera module 2100*b*. The camera module 2100*b* that receives the sync enable signal generates a sync signal based on the received sync enable signal, and transmits the generated sync signal to the camera modules 2100*a* and 2100*c* through a sync signal line SSL. The camera module 2100*b* and the camera modules 2100*a* and 2100*c* may be synchronized with the sync signal to transmit image data to the application processor 2200. In some embodiments, the control signal provided from the camera module controller 2216 to the plurality of camera modules 2100*a*, 2100*b*, and 2100*c* may include mode information according to the mode signal.

Based on the mode information, the plurality of camera modules 2100*a*, 2100*b*, and 2100*c* may be operated in a first operation mode and a second operation mode in relation to a sensing speed. The plurality of camera modules 2100*a*, 2100*b*, and 2100*c* may generate an image signal at a first speed at a first speed in a first operation mode (e.g., generate an image signal at a first frame rate), encode the image signal at a second speed greater than the first speed (e.g., encodes an image signal of a second frame rate higher than a first frame rate), and transmit the encoded image signal to the application processor 2200.

In this case, the second speed may be 30 times or less of the first speed. The application processor 2200 may store the received image signal, that is, the encoded image signal in the memory 2230 provided therein or a storage 2400 outside the application processor 2200, and thereafter, read and decode the encoded image signal from the memory 2230 or the storage 2400, and display image data generated based on the decoded image signal.

For example, a corresponding sub-processor among the plurality of sub-processors 2100*a*, 2100*b*, and 2100*c* of the image processing apparatus 2210 may perform decoding, and also perform image processing with respect to the decoded image signal. The plurality of camera modules 2100*a*, 2100*b*, and 2100*c* may generate an image signal at a third speed less than the first speed in the second operation mode (e.g., generate an image signal of a third frame rate less than the first frame rate), and transmit the image signal to the application processor 2200.

The image signal provided to the application processor 2200 may be an unencoded signal. The application processor 2200 may perform image processing on the received image signal or store the image signal in the memory 2230 or the storage 2400. The PMIC 2300 may supply power, e.g., a power supply voltage, to each of the plurality of camera modules 2100*a*, 2100*b*, and 2100*c*.

For example, the PMIC 2300, under the control of the application processor 2200, may supply a first power to the camera module 2100*a* through the power signal line PSLa, may supply a second power to the camera module 2100*b* through the power signal line PSLb, and may supply a third power to the camera module 2100*c* through the power signal line PSLc. The PMIC 2300 may generate power corresponding to each of the plurality of camera modules 2100*a*, 2100*b*, and 2100*c* in response to the power control signal PCON from the application processor 2200, and also, may adjust a level of the power.

The power control signal PCON may include a power adjusting signal for each operation mode of the plurality of camera modules 2100*a*, 2100*b*, and 2100*c*. For example, the operation mode may include a low power mode, and, in this case, the power control signal PCON may include information about a camera module operating in a low power mode and a power level to be set. Levels of powers provided to each of the plurality of camera modules 2100*a*, 2100*b*, and 2100*c* may be the same or different from each other. Also, the level of power may be changed dynamically. In the above description, the image sensor 2142 provided in at least one of the camera modules 2100*a*, 2100*b*, and 2100*c* may be the image sensor 10 or 100 according to the above-described embodiment.

The image sensor 2142 provided in some of the camera modules 2100*a*, 2100*b*, and 2100*c* may be configured to sense at least one of visible light and infrared light. The electronic device 2000 exemplarily shows a configuration using a multi-camera module, and may be changed to another form.

The image sensor, image sensing method, and electronic device including the same have been described with reference to the drawings, but these are merely exemplary, and it will be understood by those skilled in the art that various changes in form and details may be made therein without departing from the spirit and scope of the inventive concept.

While many details are set forth in the foregoing description, they should be construed as illustrative of example embodiments, rather than to limit the scope of the invention.

Therefore, the scope of the inventive concept should not be defined by the described embodiments, but should be defined by the technical spirit described in the claims. In the image sensor according to an example embodiment, since the pixel array includes physical pixels having the same size and the effective pixel size varies depending on the location, or the pixel array includes the physical pixels having different sizes depending on the location, an image sensor in which the sizes of effective pixels varies with location may be realized, and accordingly, by forming the effective pixel of the non-interested region to be greater than the effective pixel of the region of interest, a resolution of the region of interest may be realized with high resolution, and the total amount of pixel information may be reduced, thereby improving the frame rate. It should be understood that embodiments described herein should be considered in a descriptive sense only and not for purposes of limitation.

Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims and their equivalents.

What is claimed is:

1. An image sensor comprising:
a pixel array including a plurality of pixels, a plurality of row lines and a plurality of column lines;
a readout circuit configured to read out a plurality of pixel signals received from the pixel array; and
a controller configured to:
provide control signals to the pixel array through the plurality of row lines, wherein the pixel array includes a first region to an $n^{th}$ region, where n is an integer greater than or equal to 3, each of the first region to the $n^{th}$ region having different sizes; and
control a processing of the plurality of pixel signals read out from the readout circuit based on the control signals provided to the pixel array to obtain an image,
wherein the image has a first resolution to an $n^{th}$ resolution in the first region to the $n^{th}$ region,
wherein a second resolution in a second region being lower than the first resolution, and the $n^{th}$ resolution being lower than an $n-1^{th}$ resolution in an $n-1^{th}$ region,
wherein each of the first region to the $n^{th}$ region includes effective pixels,
wherein the pixel array further comprises a plurality of amplifiers corresponding to the plurality of pixels,
wherein the readout circuit comprises a switching circuit connected to the plurality of column lines and an end of each of the plurality of amplifiers and configured to receive the plurality of pixel signals from the pixel array through the plurality of column lines, and
wherein the controller is further configured to control the switching circuit provided in the readout circuit to operate in a mode to form the effective pixels in each of the first region to the $n^{th}$ region by binning on the plurality of pixel signals of the pixel array so that a number of pixels in the effective pixels in each of the first region to the $n^{th}$ region increases from the first region to the $n^{th}$ region.

2. The image sensor of claim 1, wherein the first region corresponds to a central region of the pixel array, and the second region to the $n^{th}$ region are located away from the central region towards a periphery of the pixel array.

3. The image sensor of claim 1, wherein the effective pixels of the first region have sizes corresponding to m pixels, where, m is a natural number greater than or equal to 1, and
wherein a number of pixels corresponding to effective pixels of each of the second region to the $n^{th}$ region is greater than a number of pixels corresponding to the effective pixels of the first region and increases from the second region to the $n^{th}$ region.

4. The image sensor of claim 3, wherein the switching circuit is further configured to form effective pixels of three or more sizes, by performing binning so that a size of each of the effective pixels gradually increases from the first region to the $n^{th}$ region.

5. The image sensor of claim 3, wherein the switching circuit is provided to perform binning so that an effective pixel corresponds to a first size in a central region of the pixel array, and effective pixels become larger than the first size toward a periphery of the pixel array.

6. The image sensor of claim 3, wherein each pixel of the pixel array includes a photo-sensing element, and a pixel circuit provided to obtain a pixel signal photoelectrically converted by the photo-sensing element of the pixel.

7. The image sensor of claim 1, wherein the pixel array has a structure in which physical pixels of a same size are arranged in a matrix shape.

8. The image sensor of claim 1, wherein the pixel array is provided to have effective pixels of different sizes in the first region to the $n^{th}$ region by varying sizes of physical pixels according to location.

9. The image sensor of claim 8, wherein the first region corresponds to a center of the pixel array, and the first region to the $n^{th}$ region are sequentially located from the center towards a periphery of the pixel array,
wherein the pixel array is provided to have a physical pixel of a first size at the center, and a size of a physical pixel increases towards the periphery.

10. The image sensor of claim 9, wherein a central region of the pixel array includes a plurality of pixels having the first size, and the pixel array includes pixels of second to $n^{th}$ sizes so that the sizes of the plurality of pixels gradually increases towards the periphery.

11. The image sensor of claim 1, wherein the controller is further configured to control the switching circuit to operate in a one-to-one mode in which the effective pixels correspond to pixels among the plurality of pixels in a one-to-one manner.

12. An electronic device comprising:
an image sensor configured to receive light reflected from an object, the image sensor comprising:
a pixel array including a plurality of pixels, a plurality of row lines and a plurality of column lines;
a readout circuit configured to read out a plurality of pixel signals received from the pixel array; and
a controller configured to provide control signals to the pixel array through the plurality of row lines, wherein the pixel array includes a first region to an $n^{th}$ region, where n is an integer greater than or equal to 3, the first region to the $n^{th}$ region having different sizes;
a processor configured to process the plurality of pixel signals received from the image sensor to form an image of the object having a first resolution to an $n^{th}$ resolution in the first region to the $n^{th}$ region, a second resolution in a second region being lower than the first resolution, and the $n^{th}$ resolution being lower than an $n-1^{th}$ resolution in an $n-1^{th}$ region,
wherein each of the first region to the $n^{th}$ region includes effective pixels,
wherein the pixel array further comprises a plurality of amplifiers corresponding to the plurality of pixels,
wherein the readout circuit comprises a switching circuit connected to the plurality of column lines and an end of each of the plurality of amplifiers and configured to receive the plurality of pixel signals from the pixel array through the plurality of column lines, and
wherein the controller is further configured to control the switching circuit provided in the readout circuit to operate in a mode to form the effective pixels in each of the first region to the $n^{th}$ region by binning on the plurality of pixel signals of the pixel array so that a number of pixels in the effective pixels in each of the first region to the $n^{th}$ region increases from the first region to the $n^{th}$ region.

13. The electronic device of claim 12, wherein the controller is further configured to control the switching circuit to operate in a one-to-one mode in which the effective pixels correspond to pixels among the plurality of pixels in a one-to-one manner.

14. A method of sensing an image, the method comprising:

reading out, by a readout circuit, a plurality of pixel signals received from a pixel array including a plurality of pixels, a plurality of row lines and a plurality of column lines; and providing control signals to the pixel array through the plurality of row lines, wherein the pixel array includes a first region to an $n^{th}$ region, where n is an integer greater than or equal to 3, the first region to the $n^{th}$ region having different sizes; and processing the plurality of pixel signals read out from the readout circuit based on the control signals provided to the pixel array to obtain an image, wherein the image has a first resolution to an $n^{th}$ resolution in the first region to the $n^{th}$ region, a second resolution in a second region being lower than the first resolution, and the $n^{th}$ resolution being lower than an $n-1^{th}$ resolution in an $n-1^{th}$ region, wherein each of the first region to the $n^{th}$ region includes effective pixels, wherein the pixel array further comprises a plurality of amplifiers corresponding to the plurality of pixels, wherein the readout circuit comprises a switching circuit connected to the plurality of column lines and an end of each of the plurality of amplifiers and configured to receive the plurality of pixel signals from the pixel array through the plurality of column lines, and wherein the method further comprises controlling the switching circuit to operate in a mode to form the effective pixels in each of the first region to the $n^{th}$ region by performing binning on the plurality of pixel signals of the pixel array so that a number of pixels in the effective pixels in each of the first region to the $n^{th}$ region increases from the first region to the $n^{th}$ region.

15. The method of claim 14, wherein the forming of the effective pixels comprises forming the effective pixels by performing binning so that a size of each of the effective pixels gradually increases from the first region to the $n^{th}$ region.

16. The method of claim 14, wherein the performing of the binning comprises performing binning so that an effective pixel corresponds to a first size in a central region of the pixel array, and effective pixels become larger than the first size toward a periphery of the pixel array.

17. The method of claim 14, wherein the performing of the binning comprises performing binning on the plurality of pixel signals of the pixel array by switching to selectively sum sensing signals of respective photo-sensing element of the pixels of the first region to the $n^{th}$ region.

18. The method of claim 14, further comprising controlling the switching circuit to operate in a one-to-one mode in which the effective pixels correspond to pixels among the plurality of pixels in a one-to-one manner.

* * * * *